United States Patent
Van Wiemeersch et al.

(10) Patent No.: US 11,062,582 B1
(45) Date of Patent: Jul. 13, 2021

(54) PICK-UP CARGO BED CAPACITIVE SENSOR SYSTEMS AND METHODS

(71) Applicant: Ford Global Technologies, LLC, Dearborn, MI (US)

(72) Inventors: John Robert Van Wiemeersch, Novi, MI (US); Stuart C. Salter, White Lake, MI (US); Paul Kenneth Dellock, Northville, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/785,387

(22) Filed: Feb. 7, 2020

(51) Int. Cl.
*G08B 21/00* (2006.01)
*G08B 13/26* (2006.01)
(Continued)

(52) U.S. Cl.
CPC .......... *G08B 13/26* (2013.01); *B60R 25/31* (2013.01); *G08B 21/22* (2013.01); *B60R 2325/205* (2013.01)

(58) Field of Classification Search
CPC ..... Y02T 10/70; Y02T 10/7072; Y02T 90/12; Y02T 90/14; Y02T 10/7005; Y02T 10/72; Y02T 90/16; Y02T 90/121; Y02T 90/122; Y02T 90/125; Y02T 90/167; Y02T 90/169; Y02T 10/64; Y02T 10/646; Y02T 10/92;
(Continued)

(56) References Cited

U.S. PATENT DOCUMENTS 3,961,323 A 6/1976 Hartkorn et al.
5,871,232 A * 2/1999 White ............... B60R 21/01532
280/735
(Continued)

FOREIGN PATENT DOCUMENTS

DE 102011017010 A1 12/2011
GB 2400666 B 8/2006
WO 2018099738 A1 6/2018

OTHER PUBLICATIONS

"Samsara Wireless Cargo Sensor" Web page <https://www.samsara.com/products/models/cargo.html>, 6 pages, retrieved from the internet on Nov. 10, 2020.
(Continued)

*Primary Examiner* — Daniel Previl
(74) *Attorney, Agent, or Firm* — Frank Lollo; Eversheds Sutherland (US) LLP

(57) ABSTRACT

The disclosure is directed to a vehicle cargo bed capacitive sensor system programmed to determine when items in the cargo bed (e.g., the bed of a pickup truck) are being manipulated. The system may include one or more capacitive sensors disposed on one or more cargo bed walls. The system detects items exiting the cargo bed (e.g., by falling out of the cargo bed), and detects shifting cargo. The system may also detect a person reaching into the cargo bed, and can provide information such as the location where the cargo was taken or lost from the cargo bed, and live feed images of the intruding party. The system may automatically extend and contract the capacitive field to control sensor sensitivity, and adjust the sample rate of the sensor data based on characteristics of vehicle operation, such as drive mode, speed, GPS direction, and other factors.

20 Claims, 10 Drawing Sheets

(51) Int. Cl.
*B60R 25/31* (2013.01)
*G08B 21/22* (2006.01)

(58) Field of Classification Search
CPC .. B60L 11/182; B60L 53/122; B60L 2220/12;
B60L 2220/16; B60L 2240/662; B60L
2240/665; B60L 2240/667; B60L
2250/12; B60L 2250/20; B60L 2250/22;
B60L 2260/52; B60L 2260/54; B60L
53/11; B60L 53/12; B60L 53/305; B60L
53/39; B60L 53/63; B60L 53/64; B60L
53/65; B60L 53/665; B60L 55/00; B60L
2210/30; B60L 2210/40; B60L 2240/12;
B60L 2240/14; B60L 2240/527; B60L
2240/545; B60L 2240/547; B60L
2240/622; B60L 2270/147; B60L 50/40;
B60L 50/52; B60L 53/51; B60L 53/52;
B60L 2200/12; B60L 2200/40; B60L
2240/72; B60L 2250/16; B60L 50/11;
B60L 50/51; B60L 53/126; B60L 53/32;
B60L 53/36; H02J 50/12; H02J 50/40;
H02J 50/80; H02J 2310/48; H02J 7/00;
H02J 7/00034; H02J 7/0027; H02J 7/025;
H02J 7/342; H02J 7/2434; Y02E 60/00;
Y02E 60/36; Y02E 60/366; Y04S 10/126;
Y04S 30/14; B60K 31/105; B60K 31/02;
G01R 27/02; G01R 35/005; H01F 38/14;
H02P 7/29; H02P 7/298; H02P 29/40;
H02P 3/10; H02P 3/14; H02P 9/04;
B60M 7/003; B60Y 2200/912; B61L
3/221; B82Y 30/00; C25B 15/00; C25B
1/04; C25B 9/08; F02D 31/002; H01H
1/32; H01H 9/443; H01L 27/0777; H02H
7/0844; H04L 47/70; H04L 61/2007;
H04L 67/10; H04W 52/0245; Y02B
60/50; Y02P 90/60; Y10S 388/917; Y10T
477/676
USPC .............. 340/540, 425.5, 562, 686.1, 552,
340/572.1–572.9, 448, 525,
340/636.11–636.12
See application file for complete search history.

(56) References Cited

U.S. PATENT DOCUMENTS

| 5,964,478 | A | * | 10/1999 | Stanley | ............. B60R 21/01566 |
| | | | | | 280/735 |
| 6,520,535 | B1 | * | 2/2003 | Stanley | ................. B60N 2/002 |
| | | | | | 180/271 |
| 8,031,061 | B2 | | 10/2011 | Kalous | |
| 10,048,113 | B2 | | 8/2018 | Salter et al. | |
| 10,065,601 | B2 | | 9/2018 | Haber | |
| 2013/0002443 | A1 | * | 1/2013 | Breed | ................... B65D 90/48 |
| | | | | | 340/686.1 |
| 2015/0066349 | A1 | * | 3/2015 | Chan | ..................... G01C 21/26 |
| | | | | | 701/400 |
| 2015/0244202 | A1 | * | 8/2015 | Laifenfeld | ........... B60L 11/182 |
| | | | | | 320/108 |

OTHER PUBLICATIONS

"Guardian Technologies 7001 Tailgate Alert System for Truck Beds with Tonneau Covers (Fits All Makes and Models)," Web page <https://www.amazon.com/Guardian-Technologies-7001-Tailgate-Tonneau/dp/B01D3G1EQG.html>, 8 pages, retrieved from the internet on Nov. 10, 2020.

* cited by examiner

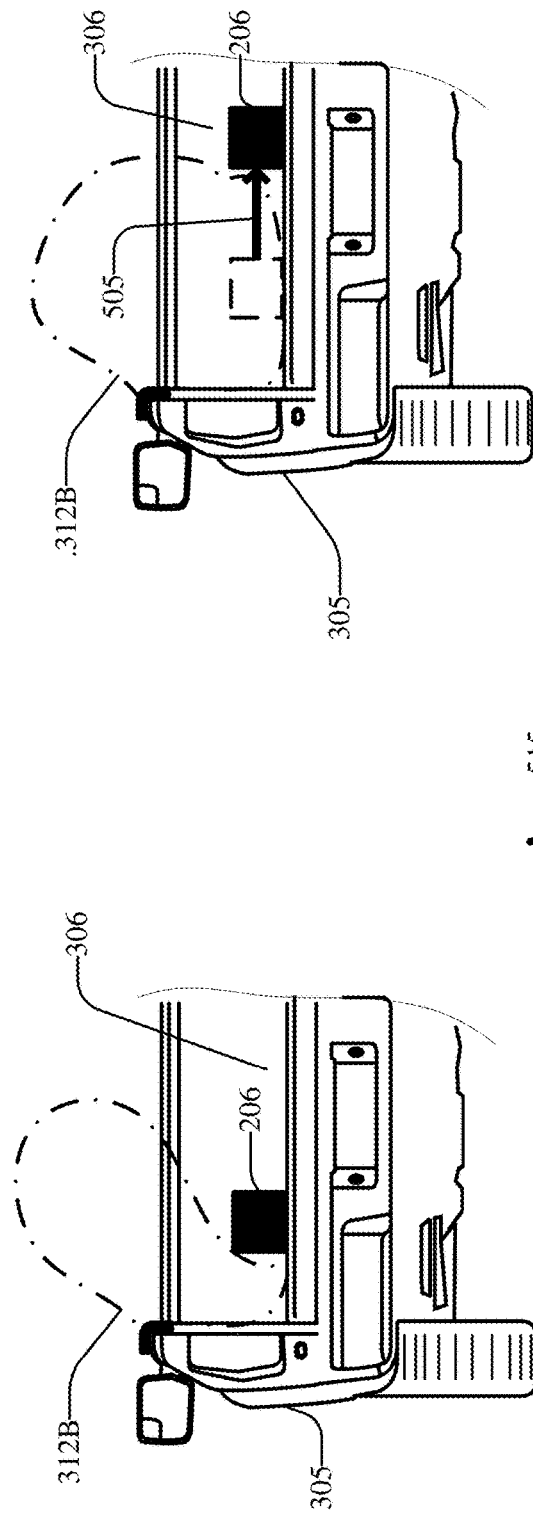
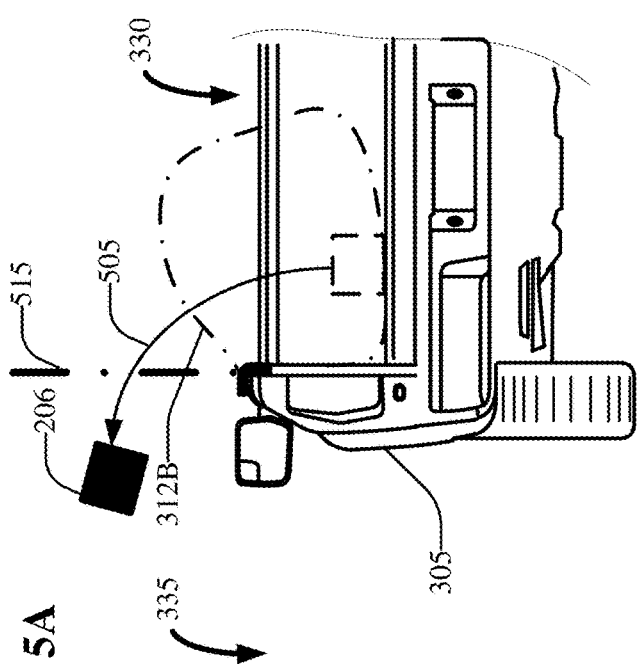
FIG. 5A  FIG. 5B  FIG. 5C

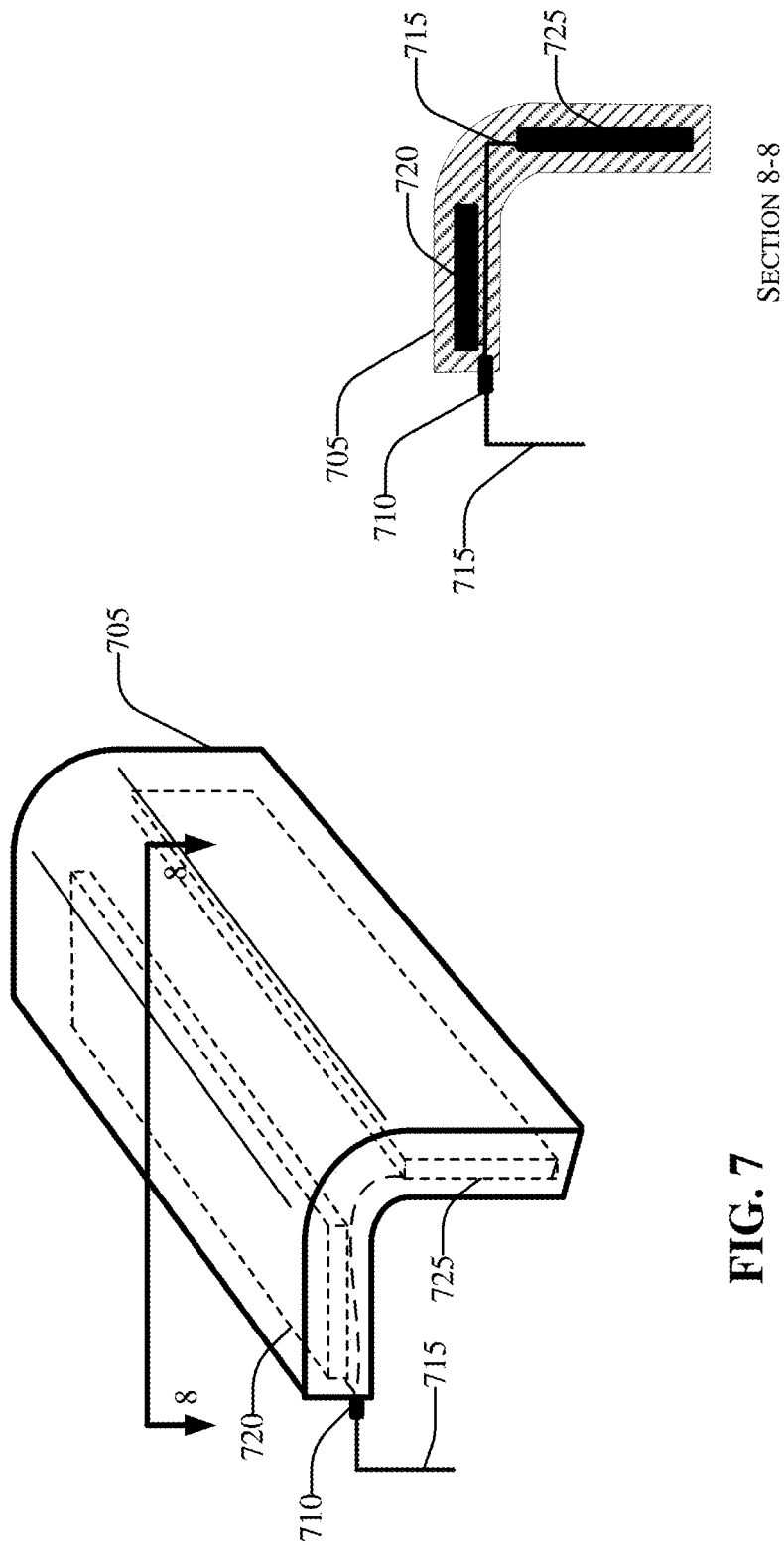

PICK-UP CARGO BED CAPACITIVE SENSOR SYSTEMS AND METHODS

TECHNICAL FIELD

The present disclosure relates to capacitive proximity sensor systems for automotive cargo beds.

BACKGROUND

Vehicles with an open cargo bed area, such as pickup trucks, are often used to carry cargo in the cargo bed.

Capacitive proximity sensing for vehicles is disclosed in W.O. Patent Publication No. 2018/099738 (hereafter "the '738 publication"), assigned to Lumileds Holding B.V. The '738 publication discloses a vehicle monitoring apparatus that includes capacitive proximity sensors used to determine whether an object is touching the vehicle. The '738 publication does not provide features that detect unauthorized access to cargo bed by individuals reaching over the truck bed, or into the truck bed when the cargo gate is down. In other aspects, the '738 publication does not include sensing capability that can indicate when an item has shifted within, or exited the cargo bed (e.g., when an item blows out of the truck bed or is taken). Moreover, conventional systems do not indicate an approximate location at which the item exited the vehicle.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 5A is a partial rear view of the vehicle of FIG. 3 with an item in the cargo bed in accordance with the present disclosure.

FIG. 5B is a partial rear view of the vehicle of FIG. 3 with the item in the cargo bed shifting position in accordance with the present disclosure.

FIG. 5C is a partial rear view of the vehicle of FIG. 3 with the item in the cargo bed shifting position such that it exits the cargo bed in accordance with the present disclosure.

FIG. 7 is an isometric view of an example capacitive proximity sensor in accordance with the present disclosure.

FIG. 8 depicts a section view of the example capacitive proximity sensor of FIG. 7 in accordance with the present disclosure.

DETAILED DESCRIPTION

Overview

Figure 1:
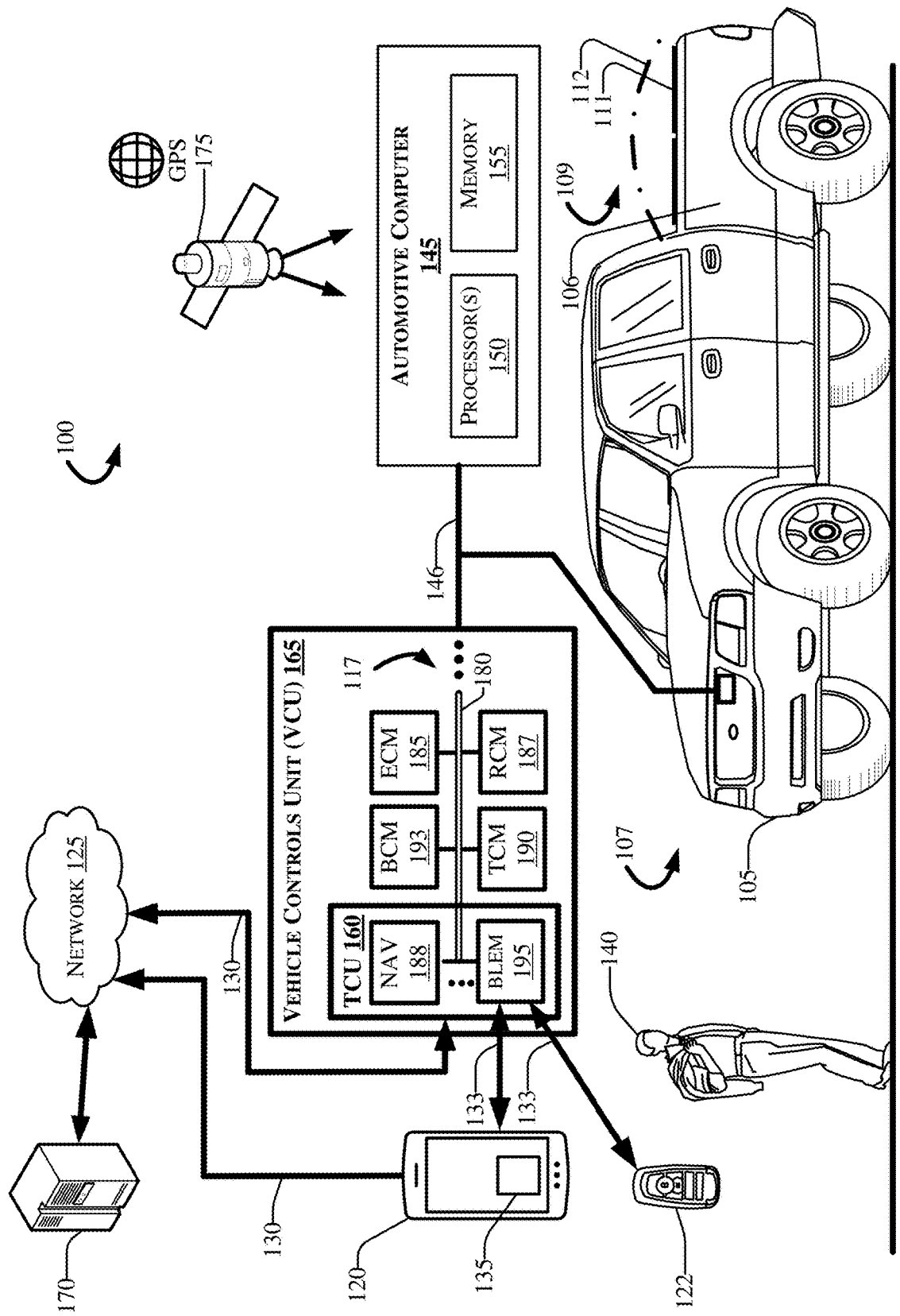
FIG. 1 depicts an example computing environment in which techniques and structures for providing the systems and methods disclosed herein may be implemented.

The systems and methods disclosed herein describe a vehicle cargo bed having a capacitive proximity sensor system. The capacitive proximity sensor system may be utilized to determine when items in the cargo bed (e.g., the bed of a pickup truck) are being manipulated, either by a person reaching into the cargo bed of the truck, or by items shifting or falling out of the vehicle during operation, and may provide an indication as to location of loss of the cargo, and provide alerts delivered via the vehicle systems and/or a mobile device.

The system may include one or more capacitive sensors disposed on top and side surfaces of one or more cargo bed walls. The system detects shifting cargo and items exiting the cargo bed (e.g., by falling out of the cargo bed) by measuring changes in electric static fields associated with the capacitive proximity sensors. The system may also detect a person approaching the cargo bed of the vehicle and/or detect an individual reaching into the cargo bed. The system may also provide information that can be used to retrieve lost items of cargo, such as, for example, a location where the cargo was taken or lost from the cargo bed, and live feed images of the individual associated with the cargo loss. The system may automatically extend and contract the capacitive field to control sensor sensitivity, based on operative characteristics of the vehicle, and adjust the sensor sensitivity and sample rate based on characteristics of vehicle operation. For example, the system may monitor vehicle drive mode, speed, GPS direction, and other factors, and use such characteristics to fine tune the operation of the capacitive sensors in the system based on operational characteristics.

In one example embodiment, the present disclosure can be used for monitoring activity in a cargo bed of a vehicle. The system may determine a vehicle drive state, such as a vehicle speed, an engine state, a drive gear position, Global Positioning System (GPS) location, or presence of a smart fob or Phone-as-a-Key (PaaK) operative as part of a passive entry passive start (PEPS) system. In one example embodiment, the system selects a capacitive field sample rate based on the vehicle drive state, and determines, based on the capacitive field sample rate, that a change of a capacitive field associated with the cargo bed of the vehicle indicates that an object in the cargo bed has changed position. The system generates a cargo alert based on the position change of the object in the cargo bed.

Aspects of the present disclosure can detect potential theft and loss of valuable cargo from a vehicle cargo bed using a low-current sensor system that remains continuously active, and detect unauthorized access to the cargo bed. Use of the disclosed system can mitigate loss of valuable items from a vehicle cargo bed, by providing actionable information that may be usable to identify the source and/or location of the loss.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

FIG. 1 depicts an example computing environment 100 that can include a vehicle 105, an automotive computer 145, a Vehicle Controls Unit (VCU) 165 disposed in connection with the automotive computer 145 by way of a power bus 146, and a mobile device 120. The mobile device 120 may be communicatively coupled with the vehicle 105 via one or more network(s) 125, and via one or more direct connection(s) which may communicate via one or more wireless channel(s) 130, via the network(s) 125, and/or via wireless channel(s) 133 that connect the mobile device 120 to the vehicle 105 directly via the VCU 165.

The mobile device 120 may include one or more applications 135. The mobile device 120 generally includes a memory (not shown in FIG. 1) for storing program instructions associated with an application 135 that, when executed by a mobile device processor (not shown in FIG. 1), performs aspects of disclosed embodiments. The application (or "app") 135 may be part of the capacitive sensor system 107, and/or may provide information to the capacitive sensor system 107 and/or receive information from the capacitive sensor system 107.

The automotive computer 145, may include one or more processor(s) 150 and memory 155. The VCU 165 may be disposed in communication with and/or be a part of the automotive computer 145. The VCU 165 may be disposed in communication with the mobile device 120 via the wireless channel(s) 130 and/or 133, with one or more server(s) 170 via the wireless channel(s) 130, and/or with a key fob 122 via the wireless channel(s) 133. The server(s) 170 may be associated with and/or include a Telematics Service Delivery Network (SDN), and may provide vehicle control access to the user 140, the key fob 122, and/or the mobile device 120 (which may, in some embodiments, also be enabled as and/or include a PEPS vehicle key). The vehicle 105 may also receive and/or be in communication with a Global Positioning System (GPS) 175.

Embodiments of the present disclosure provide a capacitive sensor system 107 for monitoring position of cargo in a cargo bed 106 of the vehicle 105 using one or more capacitive fields 112. Although illustrated as a sport utility, the vehicle 105 may take the form of another passenger or commercial automobile such as, for example, a car, a truck, a sport utility, a crossover vehicle, a van, a minivan, a taxi, a bus, etc., and may include various types of automotive drive systems.

Exemplary drive systems can include various types of internal combustion engine (ICE) powertrains having a gasoline, diesel, or natural gas-powered combustion engine with conventional drive components such as, a transmission, a drive shaft, a differential, etc. In another configuration, the vehicle 105 may be an electric vehicle (EV). More particularly, the vehicle 105 may include a battery EV (BEV) drive system, or include a hybrid EV (HEV) drivetrain having an independent onboard powerplant, a plug-in HEV (PHEV) that includes a HEV powertrain connectable to an external power source, and including a parallel or series hybrid powertrain having a combustion engine powerplant and one or more EV drive systems. HEVs can include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or operate in a fully autonomous (e.g., driverless) mode (e.g., level-5 autonomy) or in one or more partial autonomy modes. Examples of partial autonomy modes are widely understood in the art as autonomy Levels 1 through 4. An autonomous vehicle (AV) having Level-1 autonomy may generally include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and in most cases, does not include human operational driving controls.

The capacitive proximity sensor 111 shown in FIG. 1 is depicted on a top surface of the cargo bed 106 of the vehicle 105. It should be appreciated that the capacitive proximity sensor 111 may be rigidly disposed on any surface of the vehicle 105. Moreover, although depicted as a plurality of capacitive sensors, the capacitive proximity sensor 111 may embody a single sensor, or may include a plurality of capacitive sensors that work in conjunction with one another as part of a capacitive sensor bank.

According to an example embodiment, capacitive sensor system 107 may communicate with the mobile device 120 via the one or more wireless channel(s) 130. The mobile device 120 includes an application 135, which may be controllable by a user 140 as described in various embodiments. For example, the user 140 may control the application 135 operating on the mobile device 120 to continually monitor items stowed in the cargo bed 106 of the vehicle 105 (items not shown in FIG. 1), to receive images and/or video feed of the cargo bed 106 of the vehicle 105, receive information and information prompts, and provide user feedback and control settings associated with the capacitive sensor system 107, and receive cargo alerts generated by the system 107 that indicate a position change of an object in the cargo bed 106. A position change may be, for example, a shift in position of the cargo, and/or may indicate that an item has fallen out or has been taken by someone reaching into the cargo bed 106.

The network(s) 125 and wireless channel(s) 130 and 133 illustrate one example communication infrastructure in which the connected devices discussed in various embodiments of this disclosure may communicate. In some aspects, the mobile device 120 may communicate with the vehicle 105 through the one or more wireless channel(s) 130 and/or 133, which may be encrypted and established between the mobile device 120 and a Telematics Control Unit (TCU) 160 that may be operative as part of the VCU 165. The mobile device 120 may communicate with the VCU 165 using the TCU 160, which can include, for example, a Bluetooth® Low-Energy (BLE) Module (BLEM) 195. The BLEM 195 may communicate with the mobile device 120 using a wireless communication network such as, for example, the one or more network(s) 125, and/or via the wireless channel(s) 133 that directly connect the vehicle 105 to enabled devices.

The network(s) 125 may be and/or include the Internet, a private network, public network or other configuration that operates using any one or more known communication protocols such as, for example, transmission control protocol/Internet protocol (TCP/IP), Wi-Fi (based on the Institute of Electrical and Electronics Engineers (IEEE) standard 802.11), Ultra-Wide Band (UWB), and/or cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples. The wireless channel(s) 130 and/or 133 may include data connectivity using various low-energy protocols including, for example, Bluetooth®, or Near Field Communication (NFC) protocols.

The automotive computer 145 may be installed in an engine compartment of the vehicle 105 (or elsewhere in the vehicle 105) and operate as a functional part of the capacitive sensor system 107, in accordance with the disclosure. The automotive computer 145 may include one or more processor(s) 150 and a computer-readable memory 155.

The one or more processor(s) 150 may be disposed in communication with one or more memory devices (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing program code. The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In one example embodiment, the memory 155 may store information such as, for example, particular vehicle states that can indicate that someone has intruded on the vehicle 105. Such intrusions are described hereafter as a cargo bed intrusion state. The system 107 may evaluate information received from the capacitive proximity sensor 111, including, for example, a static field (also referred to herein as "a capacitive field") associated with the cargo based on the change of the capacitive field associated with the cargo bed 106. The memory 155 may store information in the form of a lookup table or other database, which may include the cargo bed intrusion state indicative that a person or object has crossed a cargo wall threshold associated with the cargo bed 106 of the vehicle 105. In some aspects, the processor(s) 150 may generate the cargo alert based on the cargo bed intrusion state.

The VCU 165 may coordinate the data between vehicle 105 systems (e.g., the ECUs 117), connected servers (e.g., the server(s) 170), the automotive computer 145, and other vehicles (not shown in FIG. 1) operating as part of a vehicle fleet (not shown in FIG. 1). The VCU 165 can include or communicate with any combination of the ECUs 117, such as, for example, a Body Control Module (BCM) 193, an Engine Control Module (ECM) 185, a Transmission Control Module (TCM) 190, the TCU 160, a Restraint Control Module (RCM) 187, etc. In some aspects, the VCU 165 may control aspects of the vehicle 105, and implement one or more instruction sets received from the application 135 operating on the mobile device 120, from one or more instruction sets received from the capacitive sensor system 107, and/or from instructions received from an autonomous vehicle (AV) controller such as an AV controller 235 discussed with respect to FIG. 2.

The TCU 160 can provide vehicle connectivity to wireless computing systems onboard and offboard the vehicle 105, and may include a Navigation (NAV) receiver 188 for receiving and processing a GPS signal from the GPS 175, the BLEM 195, a Wi-Fi transceiver, an Ultra-Wide Band (UWB) transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 180.

The BLEM 195 may establish wireless communication using Bluetooth® and Bluetooth Low-Energy® communication protocols by broadcasting and/or listening for broadcasts of small advertising packets, and establishing connections with responsive devices according to embodiments described herein. For example, the BLEM 195 may include Generic Attribute Profile (GATT) device connectivity for client devices that respond to or initiate GATT commands and requests, and connect directly with the mobile device 120, and/or one or more keys (which may include, for example, the key fob 122).

The bus 180 may include or be part of a Controller Area Network (CAN) bus organized with a multi-master serial bus standard for connecting two or more of the ECUs 117 as nodes using a message-based protocol that can be programmed to allow the ECUs 117 to communicate with each other. The bus 180 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the Capacitive sensor system 107, and/or the server(s) 170, etc.), and may also communicate with one another without the necessity of a host computer. The bus 180 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance.

The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. In an example embodiment, the ECUs 117 may control aspects of vehicle operation and communication using inputs from human drivers, inputs from an autonomous vehicle controller, the capacitive sensor system 107, and/or via wireless signal inputs received via the wireless channel(s) 133 from other connected devices such as the mobile device 120, among others. The ECUs 117, when configured as CAN nodes in the bus 180, may include a central processing unit (CPU), a CAN controller, and/or a transceiver (not shown in FIG. 1). For example, although the mobile device 120 is depicted in FIG. 1 as connecting to the vehicle 105 via the BLEM 195, it is contemplated and that the wireless channel(s) 133 may also or alternatively be established between the mobile device 120 and one or more of the ECUs 117 via the respective transceiver(s) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The central BCM 193 may also operate as a gateway for bus and network interfaces to interact with remote ECUs (not shown in FIG. 1).

Figure 2:
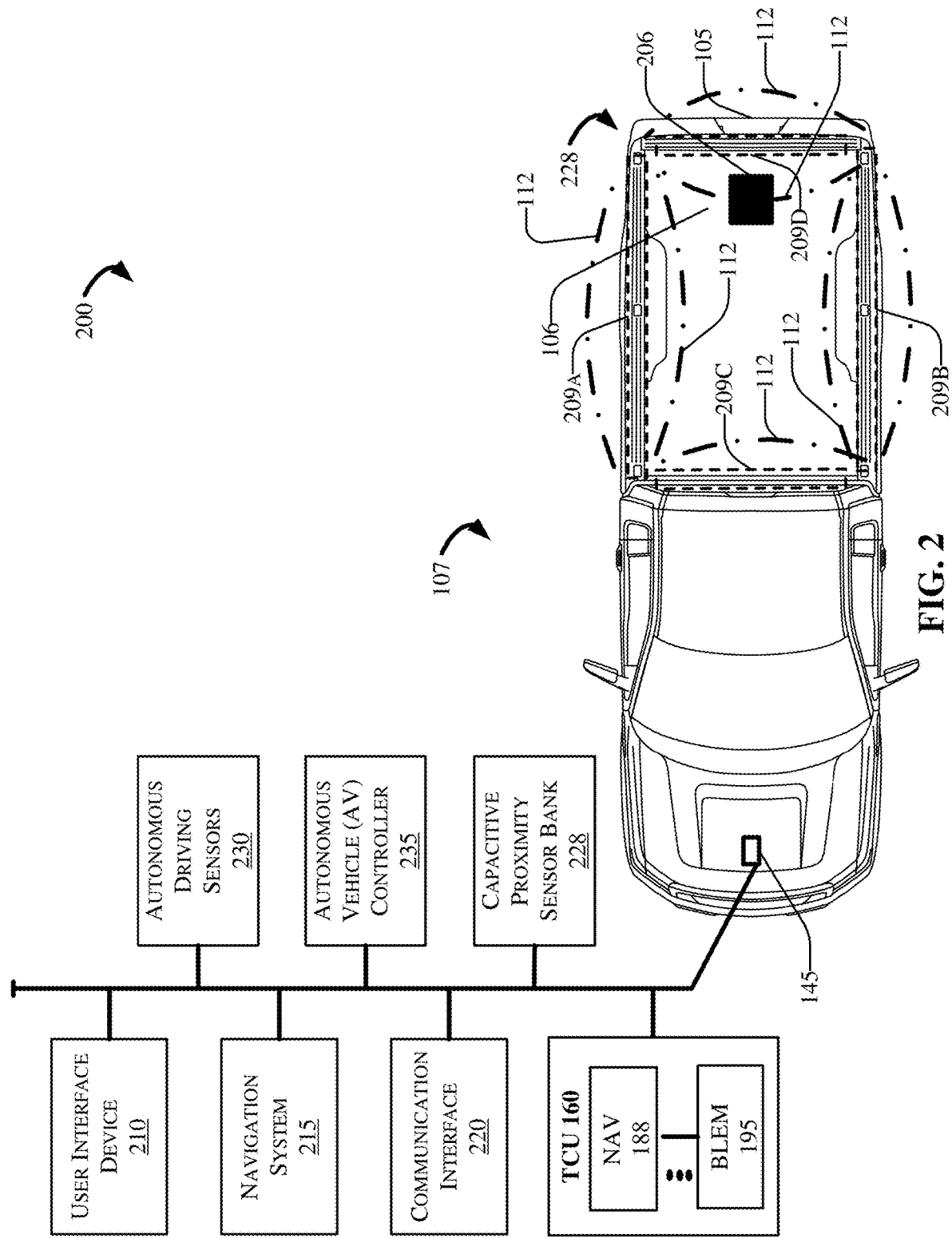
FIG. 2 depicts a functional schematic of an example control system that may be for use in an autonomous vehicle in accordance with the present disclosure.

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be programmed for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality. In one aspect, a vehicle having a trailer control system may integrate the system using, at least in part, the BCM 193. The capacitive proximity sensor 111 may be one sensor of a capacitive proximity sensor bank. One example of such a sensor bank is depicted in FIG. 2 as a capacitive proximity sensor bank 228.

In an example embodiment of the present disclosure, the BCM 193 is disposed in communication with the capacitive proximity sensor bank 228, and access one or more of the ECUs 117 and provide information to the automotive computer 145 as part of disclosed computing logic described herein. For example, the automotive computer 145 may work in conjunction with the BCM 193 (and with other ECUs 117) to determine vehicle drive states, select capacitive field sample rates, determine changes in the capacitive field associated with the cargo bed 106 of the vehicle 105, and determine positional changes of cargo in the cargo bed.

The ECUs 117 described with respect to the VCU 165 are provided for exemplary purposes only, and are not intended to be limiting or exclusive. Control and/or communication with other control modules not shown in FIG. 1 is possible, and such control is contemplated.

With respect to the computing architecture of the memory module(s), the memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc. The memory 155 may be one example of a non-transitory computer-readable medium, and may be used to store programs in code and/or to store data for performing various operations in accordance with the disclosure. The instructions in the memory 155 can include one or more separate programs, each of which can include an ordered listing of computer-executable instructions for implementing logical functions. Example logical functions are discussed with respect to FIGS. 10 and 11.

FIG. 2 illustrates an example functional schematic of a control system 200 disposed in the vehicle 105. In the example embodiment depicted in FIG. 2, the vehicle 105 is an autonomous vehicle (AV). Regardless of the level of autonomy, the control system 200 can include a user interface 210, a navigation system 215, a communication interface 220, and one or more processing device(s). When the vehicle 105 is an AV (as depicted in the example embodiment of FIG. 2) the control system 200 may further include one or more autonomous driving sensors 230 in conjunction with the AV controller 235.

The user interface 210 may be configured and/or programmed to present information to a user such as, for example, the user 140 depicted with respect to FIG. 1, during operation of the vehicle 105. Example information may be a cargo alert that indicates that cargo has shifted position in the cargo bed 106 of the vehicle 105. Moreover, the user interface 210 may be configured and/or programmed to receive user inputs, and thus, it may be disposed in or on the vehicle 105 such that it is viewable and may be interacted with by a passenger or operator. For example, in one embodiment where the vehicle 105 is a passenger vehicle, the user interface 210 may be located in the passenger compartment (or cab) of the vehicle 105. In one possible approach, the user interface 210 may include a touch-sensitive display screen (not shown in FIG. 2).

In some aspects, it is advantageous for a user of the vehicle 105 to know if there is activity at the cargo bed 106 when the vehicle 105 is parked or stopped at an intersection. For example, when the vehicle 105 is parked or stopped at an intersection, the vehicle 105 may be vulnerable to theft or tampering with items in the cargo bed 106. If the vehicle 105 is unoccupied by the user at the time of the theft or loss, it is advantageous to have additional information that may be used to mitigate such loss, such as a location at which the cargo 206 was lost, or the individual responsible for taking the cargo 206. In an example, when the vehicle 105 is in operation, a bump in the road or other turbulence may cause the cargo 206 to fly out of the cargo bed 106. It may be advantageous, therefore, to provide information to the user 140 that indicates a GPS location where the cargo 206 exited the cargo bed 106. It may be further advantageous to provide a direction that the cargo exited the vehicle, e.g., over the passenger-side wall (starboard side) of the bed, over the driver-side wall (port side) of the bed, over the rear gate of the cargo bed, etc., such that the cargo 206 may be more easily located at the provided coordinates.

Accordingly, in one example embodiment, the system 107 may provide, via the user interface 210, information indicative of an object trajectory or direction with respect to the cargo bed 106, that the cargo 206 in the cargo bed 106 followed as it exited the cargo bed 106.

In another example embodiment, the system 107 may store an activity log (not shown in FIG. 2) in the memory (e.g., memory 155 as shown in FIG. 1) that indicates locations traveled, time information, stop information, time stopped at a respective location, recorded photos and/or video feed associated with particular times, locations, and triggering events, etc.

In another aspect, it may be advantageous to provide an indication of a classification of the cargo 206 (e.g., the object in the cargo bed 106). A classification may be descriptive information such as, for example, a work tool, a package, a box, a piece of furniture, etc. Accordingly, in the event that the cargo bed 106 is holding a variety of items, the system 107 may identify a classification of an item, and provide the classification of the item as part of the activity log information.

The capacitive sensor system 107 may provide location information associated with a change of position of the cargo 206. Accordingly, the navigation system 215 may be configured and/or programmed to determine a position of the vehicle 105 in conjunction with one or more triggering events that indicate a change of position of the cargo 206. The navigation system 215 may include a Global Positioning System (GPS) receiver configured and/or programmed to triangulate the position of the vehicle 105 relative to satellites or terrestrial based transmitter towers. The navigation system 215, therefore, may be configured and/or programmed for wireless communication. The navigation system 215 may be further configured and/or programmed to develop routes from a current location to a selected destination, as well as display a map and present driving directions to the selected destination via, e.g., the user interface 210. In some instances, the navigation system 215 may develop the route according to a user preference. Examples of user preferences may include maximization of fuel/battery usage, reducing travel time, travelling the shortest distance, and/or the like. In other aspects, the navigation system 215 may develop the route according to an instruction from the capacitive sensor system 107, such as, for example, an instruction to navigate to a last known geographic point at which the cargo 206 was lost or taken from the cargo bed 106.

The communication interface 220 may be configured and/or programmed to facilitate wired and/or wireless communication between the components of the vehicle 105 and other devices, such as a remote server (the server(s) 170 as shown in FIG. 1), or another vehicle (not shown in FIG. 2) when using a vehicle-to-vehicle communication protocol. The communication interface 220 may also be configured and/or programmed to communicate directly from the vehicle 105 to the mobile device 120 (as shown in FIG. 1) using any number of communication protocols such as Bluetooth®, BLE, Wi-Fi, or UWB.

The TCU 160 may include wireless transmission and communication hardware that may be disposed in communication with one or more transceivers associated with telecommunications towers and other wireless telecommunications infrastructure. For example, the TCU 160 may be configured and/or programmed to receive messages from, and transmit messages to one or more cellular towers (not shown in FIG. 2) associated with a telecommunication provider, and/or a Telematics Service Delivery Network (SDN) associated with the vehicle 105 (such as, for example, the server(s) 170 depicted with respect to FIG. 1). In some examples, the SDN may establish communication with a mobile device (e.g., the mobile device 120 depicted with respect to FIG. 1) operable by the user 140, which may be and/or include a cell phone, a tablet computer, a laptop computer, a key fob, or any other electronic device. An internet connected device such as a PC, Laptop, Notebook, or Wi-Fi connected mobile device, or another computing device may establish cellular communications with the TCU 160 through the SDN.

The communication interface 220 may also communicate using one or more vehicle-to-vehicle communications technologies. An example of a vehicle-to-vehicle communication protocol may include, for example, a dedicated short-range communication (DSRC) protocol. Accordingly, the communication interface 220 may be configured and/or programmed to receive messages from and/or transmit messages to a remote server (e.g., the server(s) 170 depicted with respect to FIG. 1) and/or other autonomous, semi-autonomous, or manually-driven vehicles (not shown in FIG. 2).

The autonomous driving sensors 230 may include any number of devices configured and/or programmed to generate signals that help navigate the vehicle 105 while the vehicle 105 is operating in the autonomous (e.g., driverless) mode. Examples of autonomous driving sensors 230 may include a Radio Detection and Ranging (RADAR or "radar") sensor configured and/or programmed for detection and localization of objects using radio waves, a Light Detecting and Ranging (LiDAR or "lidar") sensor, a vision sensor system having trajectory, obstacle detection, object classification, augmented reality, and/or other capabilities, and/or the like. The autonomous driving sensors 230 may help the vehicle 105 "see" the roadway and the vehicle surroundings and/or negotiate various obstacles while the vehicle is operating in the autonomous mode.

The AV controller 235 may be configured and/or programmed to control one or more vehicle subsystems while the vehicle is operating in the autonomous mode. Examples of subsystems that may be controlled by the AV controller 235 may include one or more systems for controlling braking, ignition, steering, acceleration, transmission control, and/or other control mechanisms. The AV controller 235 may control the subsystems based, at least in part, on signals generated by the autonomous driving sensors 230.

The automotive computer 145 may be further disposed in communication with the capacitive proximity sensor bank 228 (hereafter "sensor bank 228"), which may include one or more capacitive proximity sensors. For example, as shown in the example embodiment of FIG. 2, the capacitive sensor bank 228 is shown with a plurality of sensors that include a capacitive proximity sensor 209A on the starboard side of the vehicle 105, a capacitive proximity sensor 209B on the port side of the vehicle 105, a capacitive proximity sensor 209C near the cab of the vehicle 105, and a capacitive proximity sensor 209D disposed on a cargo bed gate of the vehicle 105.

It is contemplated that the system 107 may include one or more of the sensors 209A-209D, and may ideally include more than 4. For example, it has been observed that a greater number of capacitive sensors in the capacitive sensor bank 228 can result in a finer detail in the detectability of cargo 206 movement in the cargo bed 106. Stated in another way, although the system 107 may include a single capacitive sensor, in embodiments where the number of capacitive sensors is greater than one, the ability to detect fine changes in the capacitive field 112 may increase. In some aspects, the reliability and accuracy of relative measurements with respect to distances of the movement, trajectory of the movement, and other changing positional information may increase with respect to the number of sensing elements in the system 107.

Figure 3:
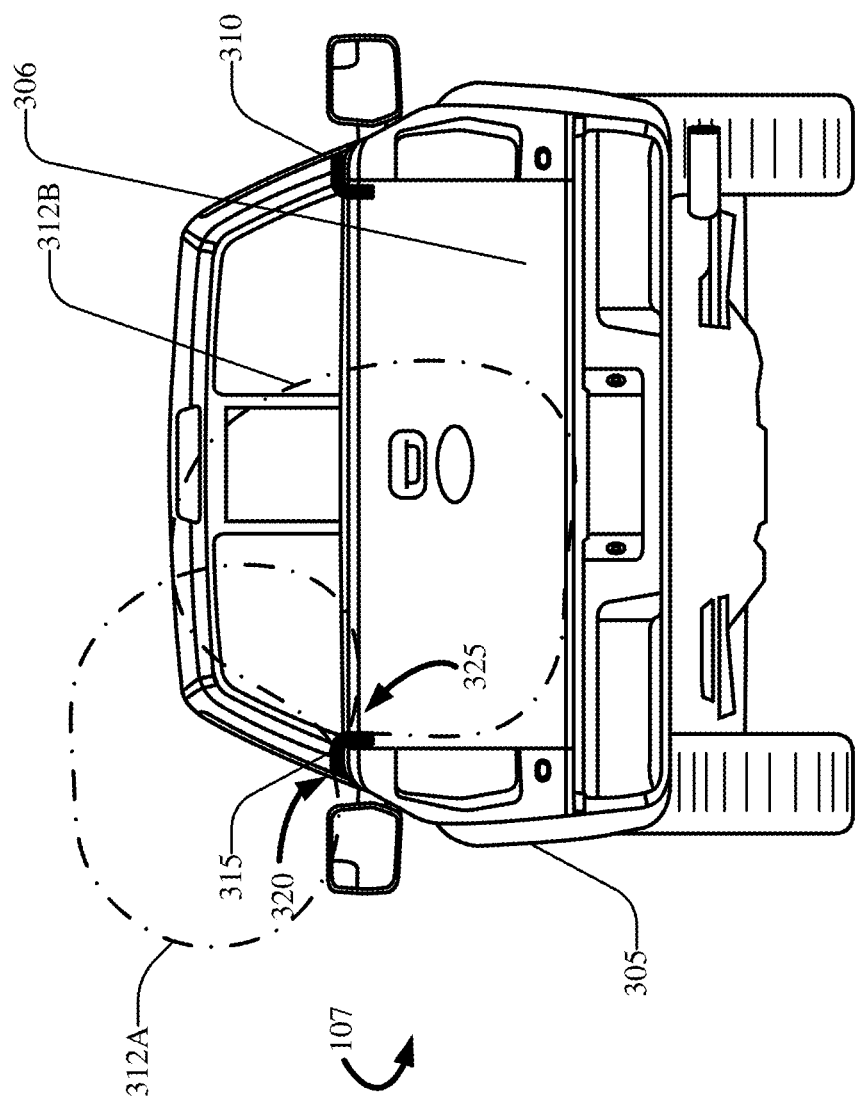
FIG. 3 is a rear view of a vehicle with a capacitive sensor system in accordance with the present disclosure.

FIG. 3 is a rear view of a vehicle 305 having a capacitive sensor system 107, in accordance with the present disclosure. The vehicle 305 may be substantially similar or identical to the vehicle 105 and/or the vehicle 105. For example, the vehicle 305 includes a cargo bed 306. The system 107 is shown in FIG. 3 with a port-side capacitive sensor 315 and a starboard-side capacitive sensor 310 disposed on a top surface of the cargo bay walls of the vehicle 305.

The port-side capacitive sensor 315 is depicted with two capacitive fields 312A and 312B. The capacitive field 312A is depicted extending from a top-facing capacitive sensor surface 320 of the port-side capacitive sensor 315. The capacitive field 312B is shown extending to an interior portion of the cargo bed 306 from the interior-facing capacitive sensor surface 325. For clarity, the capacitive fields 312A and 312B are depicted in FIG. 3. It should be appreciated that each active sensor in the system 107 (e.g., the starboard-side capacitive sensor 310) may also project a capacitive field (not shown in FIG. 3). The capacitive fields 312A and 312B may be attenuated and/or otherwise shaped by the sheet metal associated with the cargo bed 306, as well as any objects placed in the cargo bed 306.

Figure 4:
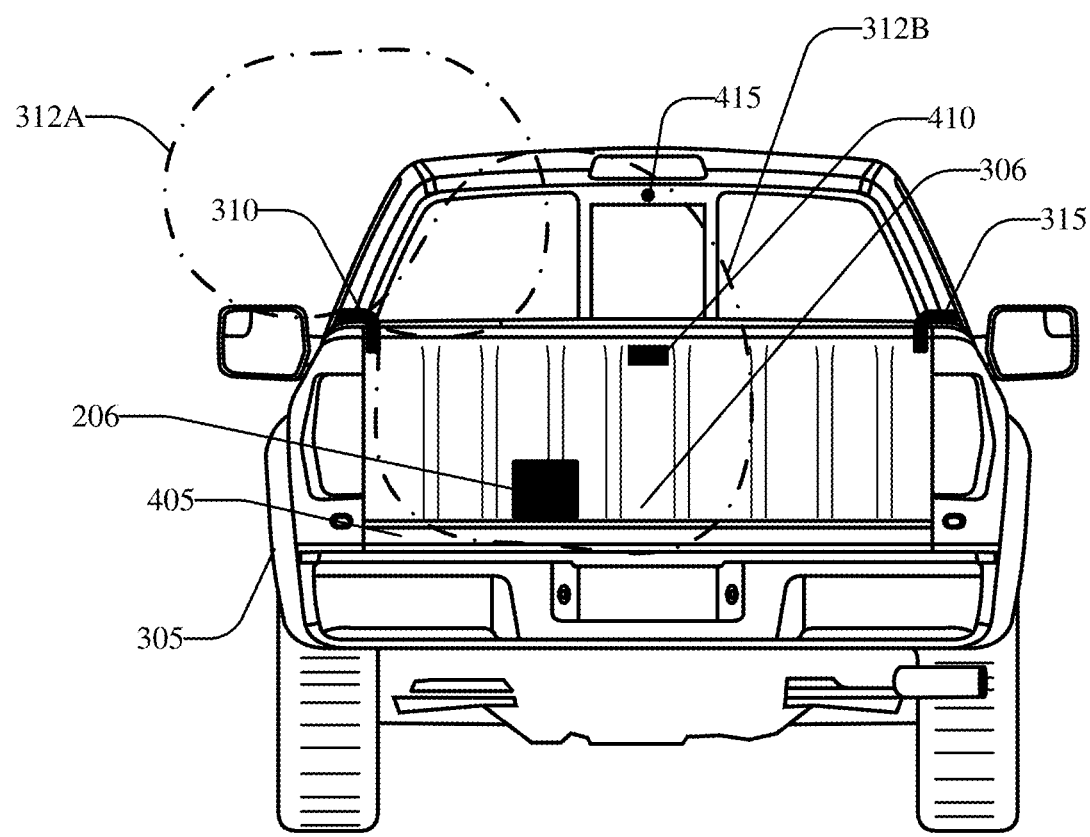
FIG. 4 is a rear view of the vehicle of FIG. 3 depicted with the cargo bed gate extended in accordance with the present disclosure.

FIG. 4 is a rear view of the vehicle of FIG. 3 depicted with a cargo bed gate 405 extended to an open position, in accordance with the present disclosure. The vehicle 305 may further include a cargo bed lamp 410, and a cargo bed camera system 415. In some example embodiments, the system 107 may determine an intrusion state that indicates that the cargo 206 has shifted position with respect to the cargo bed 306 (either by moving or shifting position in the cargo bed 306, by being ejected from the vehicle cargo bed 306 while the vehicle 305 is in operation, or by being taken from the cargo bed 306).

Other triggers are contemplated as well, such as an unauthorized individual (not shown in FIG. 4) approaching the vehicle 305 within an active zone for the passive entry passive start system (PEPS) associated with the vehicle 305 (which may be determined by the key fob 122, the mobile device 120, or via another authentication method). In another example of a triggering event, an individual may reach into the cargo bed 306 by reaching over a cargo bed wall (e.g., over one or more of the capacitive sensors 310 and 315). Reaching into the cargo bed may result in disruption (or a change) in the capacitive field(s) 312A and/or 312B. The change of the capacitive field(s) 312A and 312B may indicate an unauthorized access. In another aspect, the system 107 may determine, based on the capacitive field(s) 312A and 312B, that a position change of the cargo 206 in the cargo bed 106 is imminent or has occurred.

Responsive to the cargo bed intrusion state, an image sensor associated with the cargo bed camera system 415 may transmit an image of the cargo bed 306 to the automotive computer 145 (as shown in FIG. 1). In another aspect, the automotive computer 145 may determine a value of ambient light (which may indicate that it is too dark to obtain a quality image or video feed), activate the cargo bed lamp 410 responsive to determining that the ambient light is below a threshold value, and trigger the image sensor to obtain the image of the cargo bed 306 using the cargo bed camera system 415 while activating the cargo bed lamp 410 to illuminate the cargo bed 306.

FIGS. 5A-5C depict various examples of the cargo 206 shifting position with respect to the cargo bed 306. Considering FIG. 5A, a partial rear view of the vehicle 305 is depicted with the cargo 206 in the cargo bed 306 in accordance with the present disclosure. The capacitive field 312B is depicted as it interacts with the cargo 206. It should be noted that the capacitive field 312A and 312B are exemplary only, and may not depict literal shapes of the fields discussed herein.

FIG. 5B is a partial rear view of the vehicle of FIG. 3 with the cargo 206 in the cargo bed 306 shifting position in accordance with the present disclosure. As shown in FIG. 5B, the capacitive field 312B changes responsive to the position change 505 of the cargo 206.

FIG. 5C is a partial rear view of the vehicle of FIG. 3 with the cargo 206 in the cargo bed 306, as the cargo 206 shifts position such that it exits the cargo bed 306, in accordance with the present disclosure. The position change 505 may be a change in the position such that the cargo 206 is removed (or ejected) from the cargo bed 306. Accordingly, the automotive computer (145 as shown in FIG. 1) may determine a cargo bed intrusion state that indicates that a person or object has crossed a cargo wall threshold (e.g., the cargo wall threshold 515 as shown in FIG. 5C) associated with the cargo bed 306. In one aspect, the cargo wall threshold 515 may be a division of an interior portion 330 of the cargo bed 306 and an exterior portion 335 of the cargo bed 306. The cargo wall threshold 515 may be, therefore, an imaginary vertical extension of the cargo bed wall. In one aspect, an individual may cross the cargo wall threshold 515 by reaching into the cargo bed 306 with a body member or other object (not shown in FIG. 5C). Crossing over the cargo wall threshold 515 may cause a change in the capacitive field 312B (and/or 312A as shown in any of the prior figures), which may be detectable as a voltage difference or Fast Fourier Transform (FFT) threshold value identified by the automotive computer 145 and/or one or more of the ECUs 117. Accordingly, the automotive computer 145 may generate a cargo alert based on the cargo bed intrusion state, where the cargo bed intrusion state indicates that the capacitive field 312B has changed from a first value to a second value due to an object or person crossing over the cargo wall threshold 515.

Figure 6A:
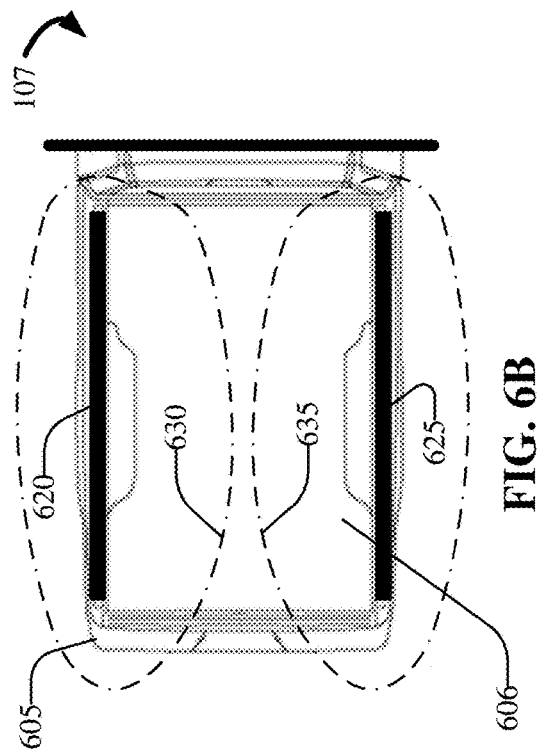
FIGS. 6A-6D depict various configurations of capacitive proximity sensors in a cargo bed of a vehicle in accordance with the present disclosure.

As briefly explained above, the configuration of the capacitive sensors in the capacitive sensor system 107 may include at least one to any number of capacitive sensors. For example, FIGS. 6A-6D depict various configurations of capacitive proximity sensors in a cargo bed 606 of an example vehicle 605, in accordance with the present disclosure. As shown in FIG. 6A, the system 107 may include a single capacitive sensor 610. The system 107 may generate the capacitive field 615A using a first input voltage, and a capacitive field 615B is generated using a second input voltage that is greater than the first input voltage. Therefore, the respective size of a capacitive field (e.g., 615A, 615B) may be proportional to the input voltage associated with the respective capacitive sensor. By increasing the input voltage sensitivity (depicted as the capacitive field 615B), a single capacitive sensor 610 may be used to detect movement in the cargo bed 606. Accordingly, the processor(s) 150 (shown in FIG. 1) may determine that a change of the capacitive field 615B associated with the cargo bed 606 of the vehicle 605 indicates that an object (not shown in FIG. 6A) in the cargo bed capacitive field 610 has changed its position with respect to the cargo bed 606.

Figure 6B:
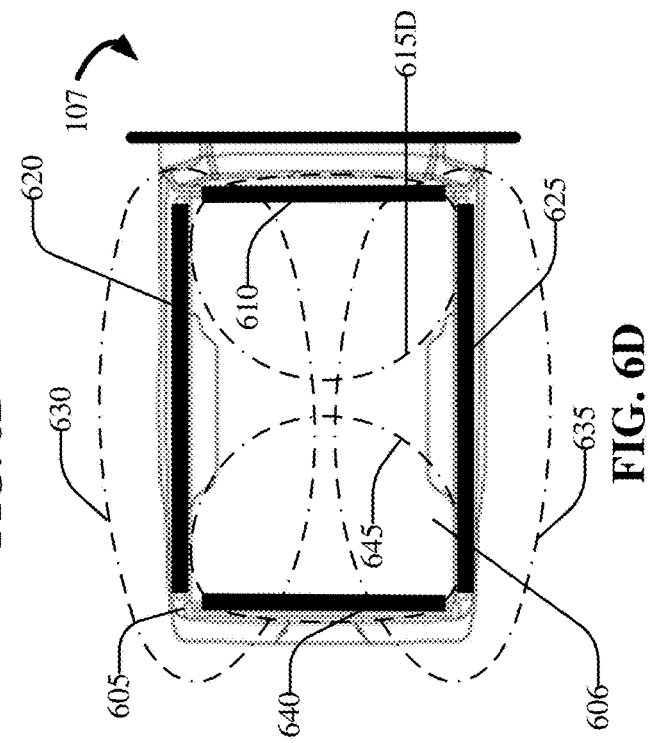

As shown in FIG. 6B, the system 107 is depicted with two capacitive sensors 620 and 625, respectively, which are associated with capacitive fields 630 and 635.

Figure 6C:
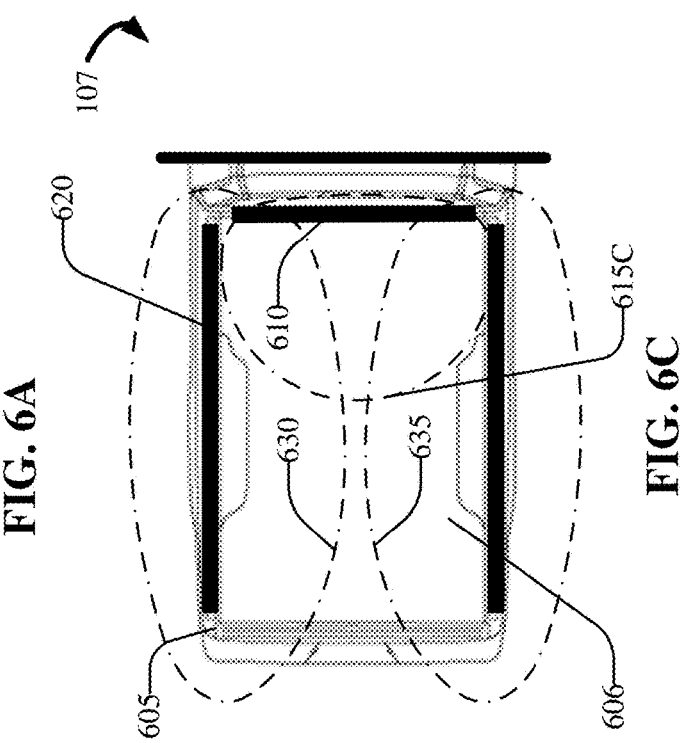
Figure 6D:
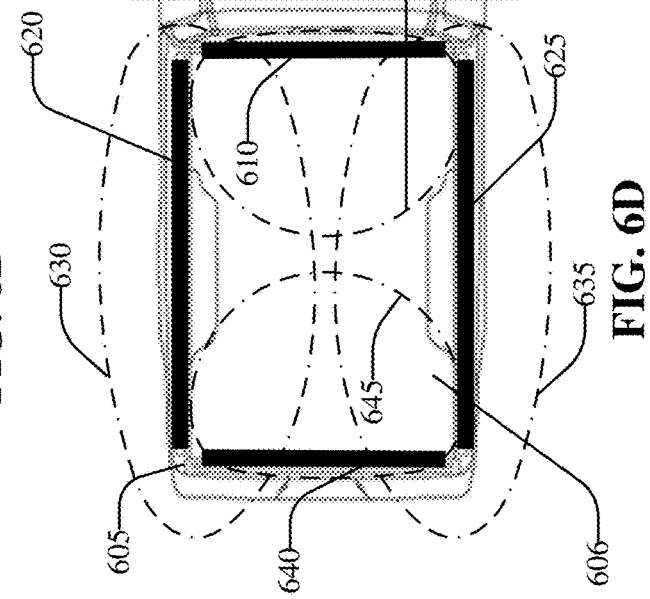

FIG. 6C depicts the system 107 having three capacitive sensors that include the sensors 610, 620 and 625. The capacitive fields 615C, 630, and 635 are shown intersecting one another. Similarly, FIG. 6D depicts a fourth sensor 640 generating a fourth capacitive field 645, in conjunction with capacitive fields 615D, 630, and 635. It should be appreciated that any number of capacitive sensors may be included in the system 107. For example, in another embodiment, at least four sensors may be disposed along each side of the vehicle.

In another aspect, sensors disposed on the cargo bed gate of the vehicle may provide a secondary means of object detection for proximity of objects to the vehicle when the vehicle 605 is operated while the gate of the cargo bed 606 is extended to an open position (see, for example, FIG. 4, which depicts the cargo bed gate 405 extended in an open position). For example, the fourth sensor 640 is depicted on the back gate of the cargo bed 605. In one example embodiment, the fourth capacitive field 645 extends from the fourth sensor 640 such that, when the back gate of the cargo bed is extended to an open position (that is, the cargo bed gate is unlatched and extended out such that the gate is substantially co-planar with the cargo bed) the sensor 640 may serve as an additional backup sensor. Accordingly, the sensor 640 may be used to determine that an object is proximate the back gate as the vehicle moves in reverse with the gate extended out, and/or may be used to determine movement in an area proximate to the back gate, such as a person or object entering into the vehicle's path as it moves in reverse. In some aspects, the vehicle may avoid damaging the gate or other objects due to an unintended collision while using the fourth sensor 640 as an additional backup sensor.

FIG. 7 is an isometric view of an example capacitive proximity sensor 705, in accordance with the present disclosure. The capacitive sensor 705 is one example embodiment for constructing the capacitive proximity sensors disclosed herein. In one example, the sensor 705 includes one or more thin film insert sensors 720 and 725, which may be constructed of a thin film substrate (e.g., a 15 mil) upon which a silver ink layer (not shown in FIG. 7) may be deposited and electrically connected with a respective data channel 715. The data channel(s) 715 may terminate at a connector 710, which may connect the capacitive sensor 705 to one or more ECUs 117.

The example embodiment depicted in FIGS. 7 and 8 depicts two distinct and separate conductive sensors 720 and 725, however it is contemplated that the sensor 705 may be constructed with a single thin film sheet instead of a two parts construction. One benefit of such an embodiment may be simplicity of manufacturing. Further, the sensors may be constructed using conductive paint applied to the trim in sections to create capacitive sensors.

In the embodiment shown in FIGS. 7 and 8, by constructing the sensor 705 to include two separately connectible sensors 720 and 725, the system 107 may distinguish between two distinct capacitive fields. For example, the processor(s) 150 may distinguish between an interruption to the capacitive field 312A, generated by the sensor 720, from an interruption to the capacitive field 312B generated by the film insert (where the respective capacitive fields are as shown in FIG. 3).

FIG. 8 depicts a section view 8-8 of the example capacitive proximity sensor 705, in accordance with the present disclosure. In one aspect, the sensors 720 and 725 may be insert molded in a two-step manufacturing process such that the connector 710, the data channels 715, and the sensors 720 and 725 are over molded into a unified sensor. Although generally depicted as "L" shaped, it should be appreciated that the sensor 705 may take another form or shape.

In another aspect, in lieu of over-molding the sensors 720 and 725, the electrodes may be constructed with an electrically active polymer, such as a metal impregnated thermoplastic having electrical connectivity with an insert molded connector 710.

In yet another aspect, it is contemplated the thin film sensors 720 and 725 may be adhered to a vehicle surface, such as, for example, on the cargo bay wall pointed toward the cargo bay interior, and on the top surface of the cargo bay wall pointed toward the sky in lieu of providing the film inserts as a separate part from the vehicle body. In such an embodiment, the sensors 720 and 725 may be rigidly disposed on the cargo bay wall surfaces using known fastening means, then over-coated with a protective layer, such as a plasticized bed liner material. Over-coating the sensors 720 and 725 may provide protection from damage and weather conditions, while simplifying manufacturing process, by providing a unified body integration with the vehicle 105.

Capacitive fields may be interrupted with increasing or decreasing sensitivity, which may be adjustable based on a sensitivity threshold for sensor output. The system 107 is useful for determining unauthorized access to the vehicle 105 cargo bed 106 during operation of the vehicle. Depending on the situation, the sensing field (e.g., the capacitive fields 312A and 312B) can be extended far enough to make it virtually impossible to reach inside the vehicle cargo bed 306 without activating a system trigger (e.g., exceeding a threshold value for capacitance, voltage, Fast Fourier Transform (FFT), etc.). This can be done by increasing the drive current to the capacitive sensors.

As with most electronic sensing systems, samples are taken at discrete steps or intervals, recorded in a persistent memory, and analyzed using a computing logic. According to some embodiments of the present disclosure, false positives (e.g., false alarms that incorrectly predict unauthorized access to the cargo bed 306) may be avoided by adjusting a sample rate of the capacitive values from the sensor bank. In one embodiment, the rate for sampling the capacitance may be moderated as a function of vehicle speed, and other factors associated with vehicle use and/or location. For example, it may be advantageous to sample at a relatively higher rate when driving at highway speeds, but we can sample slowly when stationary with engine ON and then sample at the slowest rate when the vehicle is off and parked.

In another aspect, it may be advantageous to desensitize the sensor bank, obtain samples at a slower rate, or shut down one or more of the capacitive sensors responsive to detecting that one or more of the sensors are adjacent to a stationary obstacle such as a wall, where there is limited space between a cargo bay wall and the obstacle that limits the ability for someone to reach into the carbo bay. For example, in one embodiment, the processor(s) 150 may determine a proximity of the vehicle 105 to an adjacent obstacle, and responsive to determining that the vehicle 105 is less than a threshold distance to the obstacle while parked, disengage one or more capacitive sensors of the sensor bank.

In another embodiment, in some situations, it may be advantageous to prevent false alarms by the system 107 that incorrectly indicate unauthorized entry. For example, when the vehicle is in motion, the system 107 may increase the sample rate based on operational factors that can include, for example, a vehicle speed, a proximity of the key fob 122 to the vehicle 105, while the vehicle 105 is in motion, a GPS indication of changing location with respect to time, a GPS indication with respect to a geo-fence, and other event metrics collected by the TCU 160. Other event metrics may include, for example, a GPS location, a turn radius, a braking severity, a rate of acceleration, etc. In yet another example, the processor(s) 150 may change the sample rate based on a detected cargo size. The cargo size may be determined by one or more piezoelectric signals associated with the load in the cargo bed of the vehicle. In another aspect, the cargo size may be determined using the camera system, where the automotive computer 145 determines, from one or more images received from the camera system, a composition of the cargo in the cargo bed, determines a volume of the cargo in the cargo bed, and estimates a cargo mass based on the composition of the cargo in the cargo bed and the volume of the cargo. In an embodiment, the processor(s) 150 may adjust the sample rate based on the estimated cargo mass. For example, if the cargo mass is large, the sample rate may be reduced due to the reduced possibility of rapid cargo shifting with respect to time, vehicle speed, etc.

In another embodiment, it may be advantageous to prevent false alarms by the system 107 that incorrectly indicate unauthorized entry while the vehicle is parked or stopped at a traffic light. For example, when the vehicle is stopped or parked, the sample rate may be decreased. The system 107 may reduce false alarms by determining, in response to a change of capacitive field, that an authorized key fob 122 is proximate to the vehicle 105.

Figure 9A:
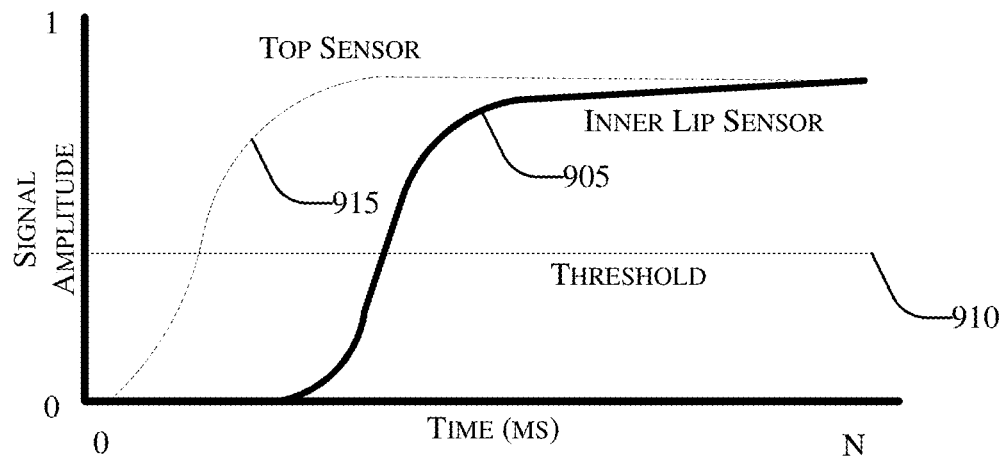
FIG. 9A is an example diagram of signal amplitudes of capacitive sensors graphed with respect to time in accordance with the present disclosure.
Figure 9B:
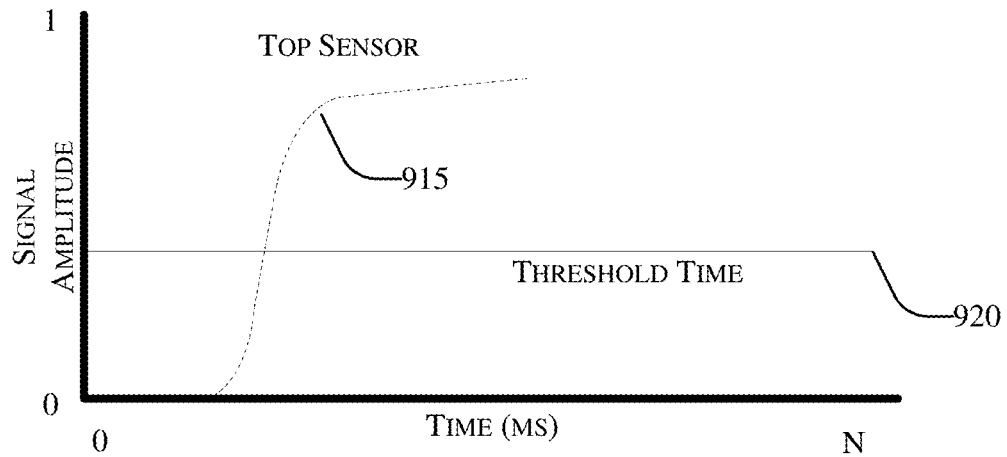
FIG. 9B is another example diagram of a signal amplitude for a capacitive sensor graphed with respect to time in accordance with the present disclosure.

FIG. 9A depicts an example diagram of signal amplitudes of the capacitive sensors depicted with respect to FIG. 7 including the film insert for the top sensor 720, and the film insert for the inner lip sensor 725 (both shown in FIG. 7), graphed with respect to time in accordance with the present disclosure. As described above, while requiring that there be at least one sensor, the system 107 may include any number of capacitive sensors, and in fact, may experience increased sensitivity as the number of capacitive sensors is increased. With reference again to FIG. 7, the sensor 705 may be constructed from two film insert sensors 720 and 725, which can provide proximity detection in two directions using the same sensor 705. For example, with separate top and inner sensors (e.g., the film insert for the top sensor 720 and the film insert for the inner lip sensor 725, respectively), once the system 107 detects an authorized presence nearby (e.g., proximate to the vehicle 105), the system 107 may look for 1) the top sensor 720 to exceed a threshold 910 and remain high, followed by 2) the inner lip sensor 725 exceeding the threshold 910 and also remaining high. FIG. 9 depicts the top sensor signal amplitude 915 and the inner lip sensor signal amplitude, with respect to time. The scenario depicted in FIG. 9 may illustrate a triggering event for a sensor having two electrodes, according to one embodiment, FIG. 9B is another example diagram of a signal amplitude for a single capacitive sensor graphed with respect to time in accordance with the present disclosure. When configured with a single capacitive sensor, the system 107 would determine only the sensor exceeds a threshold value. Responsive to exceeding the threshold value, the system 107 may determine that a triggering event has occurred, and thus generate a cargo alert.

Figure 9C:
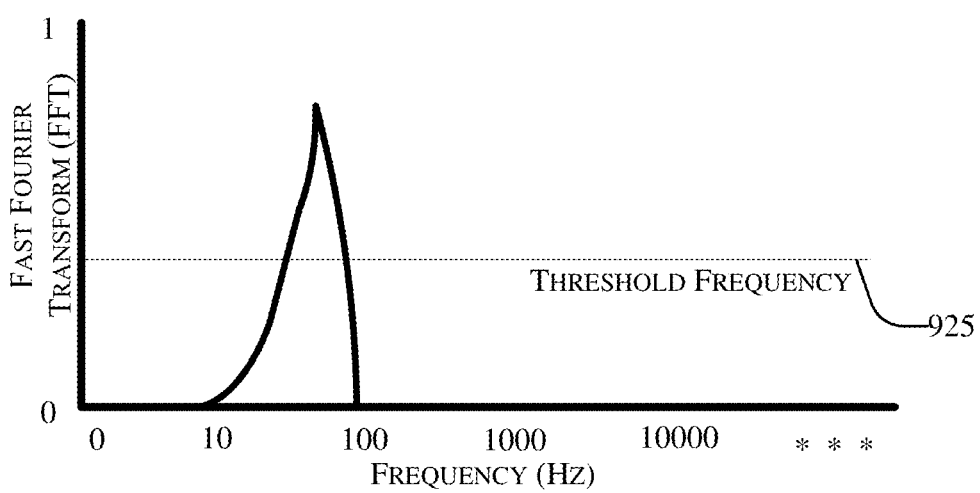
FIG. 9C illustrates another example diagram showing a Fast Fourier Transform (FFT) measurement of a signal graphed with respect to signal frequency in accordance with the present disclosure.

FIG. 9C illustrates another example diagram showing a Fast Fourier Transform (FFT) measurement of a signal graphed with respect to signal frequency in accordance with the present disclosure. A robust method to differentiate between human presence vs. environmental factors (such as rain, snow, condensation), if a sufficient number of samples can be collected before a decision is made, is to perform a Fast Fourier analysis, i.e., by analyzing the data in the frequency domain. Our body motion is confined in a fairly tight frequency range, e.g., 5-25 Hz. After performing a FFT (Fast Fourier Transform) to the sample data, the processor(s) 150 may determine whether the frequency content of that motion is bound in such range. According to an embodiment, the processor(s) 150 may wait for signal in the time domain to exceed a frequency threshold 925. Responsive to determining that a triggering event is detected, the processor(s) 150 may adjust a sample rate to a relatively higher sample frequency rate. A relatively higher sample frequency rate may be, for example, 5 msec between samples. The processor(s) 150 may collect a predetermined number of samples (e.g., 256 samples) and perform FFT on the samples. The processor(s) 150 may next determine which samples exceed the frequency threshold 925. If no samples exceed the threshold, then no event is recorded. If at least one sample exceeds the threshold, the processor(s) 150 may determine a range of active frequency, and determine whether the range of active frequency are compatible with a known human frequency range. Responsive to determining that the frequency values are compatible, the processor(s) 150 may trigger intrusion event.

Figure 10:
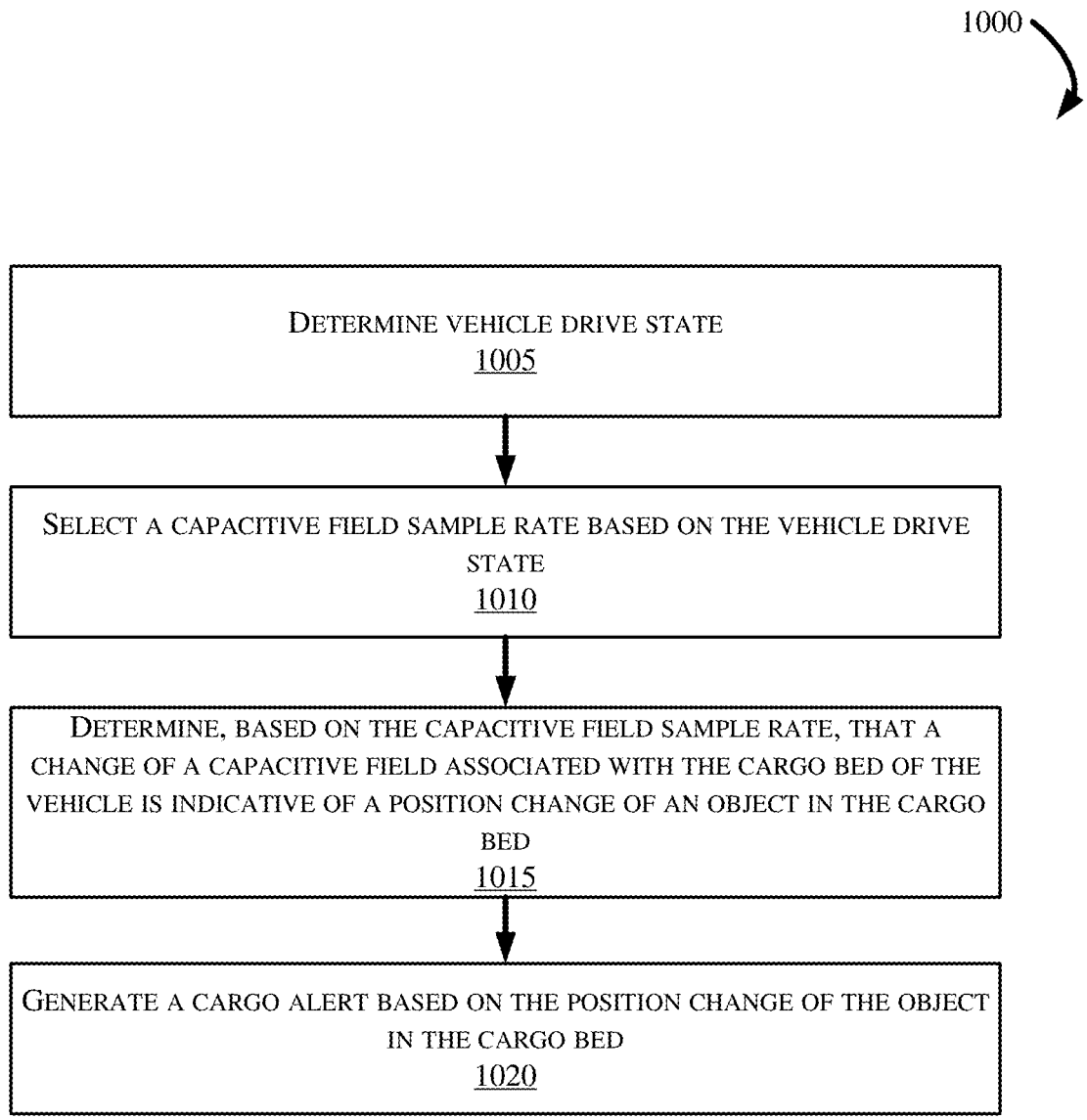
FIG. 10 depicts a flow diagram in accordance with the present disclosure.

FIG. 10 is a flow diagram of an example method 1000 for monitoring activity in a cargo bed of a vehicle, according to the present disclosure. FIG. 10 may be described with continued reference to prior figures, including FIGS. 1-9. The following process is exemplary and not confined to the steps described hereafter. Moreover, alternative embodiments may include more or less steps that are shown or described herein, and may include these steps in a different order than the order described in the following example embodiments.

Referring first to FIG. 10, at step 1005, the method 1000 may commence with determining a vehicle drive state. Determining the vehicle drive state may include receiving, from the one or more of the autonomous driving sensors 230, the AV controller 235, the navigation system 215, and/or the VCU 165, a drive mode of the vehicle engine or motor(s). Examples of the drive mode can include a vehicle in park, drive, neutral, low gear, etc. The drive mode may also include any combination of information associated with a vehicle speed, a turn radius, an acceleration rate, a severity of braking action, vehicle inertial information, ambient temperature, road conditions, weather conditions, and/or other information associated with operation of the vehicle 105. In other aspects, the drive mode may include information associated with vehicle location (e.g., one or more GPS coordinates), or other vehicle drive information.

Next, the method includes a step 1010 of selecting a capacitive field sample rate based on the vehicle drive state. In one aspect, the processor(s) 150 may cause the BCM 193 or another of the ECUs 117 configured and/or programmed to control sample rate for the capacitive proximity sensor 109, to set the capacitive sensor sample rate of the sensor 109 as a function of vehicle speed.

At step 1015, the method includes a step of determining, based on the capacitive field sample rate, that a change of a capacitive field associated with the cargo bed of the vehicle is indicative of a position change of an object in the cargo bed.

At step 1020, the method includes a step of generating a cargo alert based on the position change of the object in the cargo bed. Accordingly, the processor(s) 150 may select a capacitive sensor input voltage based on the vehicle drive state, and determine the position change based on the capacitive sensor input voltage. An intrusion state may indicate that an intruder has crossed a vehicle threshold, such as by reaching over the wall of the cargo bed 106 so as to remove an item from the cargo bed. The processor(s) 150 may determine a cargo bed intrusion state based on the change of the capacitive field associated with the cargo bed 106. The cargo bed intrusion state may indicate that a person or object has crossed a cargo wall threshold associated with the cargo bed. Accordingly, the processor(s) 150 may generate the cargo alert based on the cargo bed intrusion state.

For example, with reference again to FIG. 2, the processor(s) 150 may determine a cargo bed intrusion state by evaluating changes in capacitive fields associated with the capacitive proximity sensor bank 228. Determining the change of the capacitive field 112 can include receiving, from the capacitive proximity sensor bank 228 disposed proximate to the cargo bed 106 of the vehicle 105, a first capacitance value for the capacitive field 112. A capacitance value may be, for example, an input voltage or an FFT value associated with the capacitive field 112. Other metrics associated with capacitive sensors are possible, and such metrics are contemplated. The processor(s) 150 may receive, from the capacitive proximity sensor bank 228, a second capacitance value for the capacitance field 112, and determine, based on the first capacitance value and the second capacitance value, that the object in the cargo bed 106 has changed position with respect to the cargo bed 106. Accordingly, the determination may be made by comparing the first and the second capacitance values to determine if a threshold change of values has been met.

In another embodiment, with reference once again to FIG. 10, the step 1020 of generating the cargo alert may include providing information associated with a particular location at which the intrusion or loss of an item occurred. For example, the processor(s) 150 may determine a geographic location associated with the cargo bed intrusion state, and updating an intrusion event log to record the geographic location. The intrusion event log, which may be stored in the memory 155, on the server(s) 170, or on the mobile device 120 by the application 135. Accordingly, the processor(s) 150 and/or the application 135 may send the cargo alert to the mobile device 120 associated with the vehicle 105, and output the cargo alert using the application 135 on the mobile device 120.

In other aspects, generating the cargo alert can include providing image and video data associated with the cargo bed intrusion state. For example, generating the cargo alert may include triggering, responsive to the cargo bed intrusion state, an image sensor associated with the cargo bed camera system 415, to obtain an image of the cargo bed 106. This step may, in another embodiment, include determining a value for ambient light, to determine whether it is dark outside or there is enough ambient light to obtain a clear photo or video feed. The processor(s) 150 may activate the cargo bed lamp 410 responsive to determining that the ambient light is below a threshold value. Accordingly, the processor(s) 150 may then trigger the image sensor associated with the cargo bed camera system 415 to obtain the image of the cargo bed 106 while activating the cargo bed lamp 410. In other aspects, the system 107 may trigger the cargo bed lamp without taking image information, which may deter individuals attempting to take items from the bed of the vehicle without authorization.

Other triggered events are contemplated for determining the cargo bed intrusion state. For example, responsive to determining that the person or object has crossed the cargo wall threshold 515, the system 107 may determine that the key fob 122 is not within a threshold distance from the vehicle 105. A threshold distance may be 3 meters, 5 meters, 10 meters, in the interior of the vehicle, or another fixed and predetermined distance. The processor(s) 150 may sound an audible alarm responsive to determining that the key fob 122 is not within the predetermined distance from the vehicle, or alternatively, responsive to determining that a key fob is not authorized. An unauthorized key fob may be a key fob that has had authorized access at some time in the past, but such authorization has been revoked by the server(s) 170 and/or the VCU 165. In an embodiment, the user 140 may also provide instructions to the system 107 via the application 135 on the mobile device. For example, the user may provide, via the mobile device 120, a message comprising a vehicle control instruction, where the instruction requests a video feed and/or a photo image of the incident that triggered the alert. The processor(s) 150 may receive the response message having the vehicle control instruction, obtain video data and image data from the cargo bed camera system 415, and save a video feed of the person or object crossing the cargo wall threshold to the memory 155, responsive to the vehicle control instruction.

Figure 11:
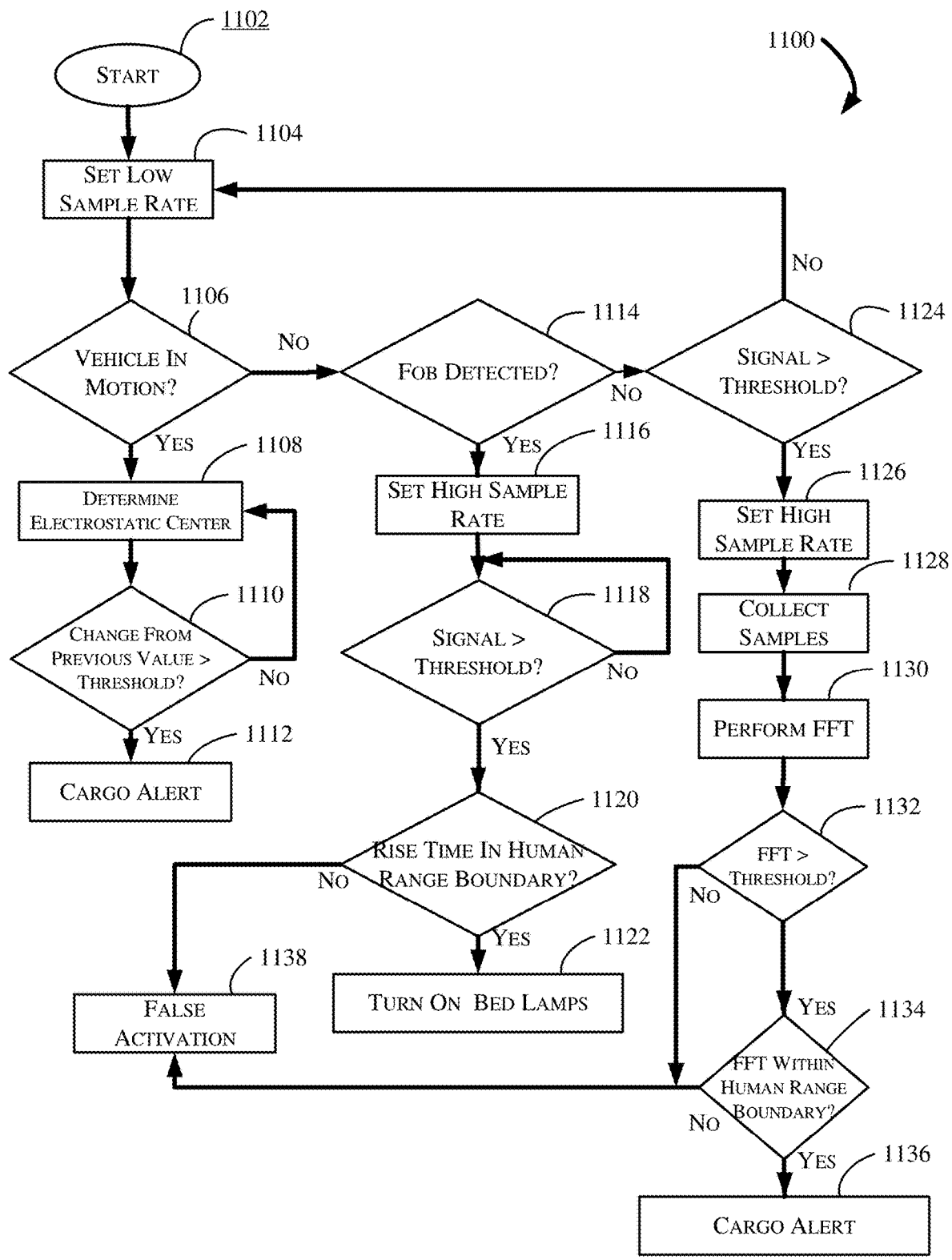
FIG. 11 illustrates a flow diagram of an example computing logic in accordance with the present disclosure.

FIG. 11 illustrates a flow diagram 1100 of an example computing logic, in accordance with the present disclosure. After an initial starting step 1102, which may be triggered by providing power source to the system 107, the processor(s) 150 may set a first sample rate, referred to herein as a "low sample rate." The low sample rate may be one of a plurality of sample rates. Setting the lower sample rate (step 1104) as described herein may preserve battery resources when powering the system 107 while parked for extended periods, and for situations where low vehicle speed or other factors described above.

At step 1106, the processor(s) 150 may determine whether the vehicle is in motion, and responsive to determining that the vehicle 105 is moving, determine an electrostatic center 1108 of the capacitance fields associated with the active sensors in the capacitive sensor bank 228.

At step 1110 the processor(s) 150 may determine whether there is a change from a previous value that exceeds a threshold, and issue a cargo alert at step 1112 responsive to a positive determination. If there was no change from the previous value, the system 107 may continually monitor the capacitive electrostatic center.

At step 1106, if the processor(s) 150 determine that the vehicle is not in motion, at decision step 1114, the system 107 may determine whether an authorized key fob 122 is detected within the PEPS zone (e.g., a predetermined operative distance) from the vehicle 105. The processor(s) 150 may set a relatively high sample rate 1116 responsive to detecting that the authorized key fob 122 is within the operative distance, then test whether the capacitive signal exceeds a threshold value at step 1118. Responsive to determining that the threshold value is exceeded, the processor(s) 150 may evaluate the rise time in the human range boundary. Step 1120 may include determining, from the change in capacitance fields, that a human has approached the cargo bed. Responsive to determining that there is a rise in the human range boundary the processor(s) 150 may turn on the cargo bed lamp 410 at step 1122. If the processor(s) 150 determine that there is no rise in the human range boundary, the system 107 may log a false activation at step 1138.

Returning again to the decision step 1114, responsive to determining that the key fob 122 is not detected, the processor(s) 150 may determine whether the capacitive field signal is greater than the predetermined threshold at step 1124. When the system determines that the threshold is exceeded, the processor(s) 150 may set a high sample rate at step 1126, collect a plurality of samples at step 1128, and process the sampled values using a FFT analysis at step 1130. At step 1132, responsive to determining that the FFT is greater than a predetermined FFT threshold, the system 107 may issue a cargo alert at step 1136. If the threshold is not exceeded at step 1134, the processor(s) 150 may log the false activation at step 1138.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation. All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for monitoring activity in a cargo bed of a vehicle, comprising:
   determining a vehicle drive state;
   selecting a capacitive field sample rate for a capacitive sensor associated with the cargo bed of the vehicle based on the vehicle drive state;
   determining, based on data from the capacitive sensor obtained at the capacitive field sample rate, that a change of a capacitive field associated with the cargo bed of the vehicle is indicative of a position change of an object in the cargo bed; and
   generating a cargo alert based on the position change of the object in the cargo bed.

2. The method according to claim 1, further comprising:
   selecting a capacitive sensor input voltage based on the vehicle drive state; and
   determining, based on the capacitive sensor input voltage, the position change of the object in the cargo bed.

3. The method according to claim 1, further comprising:
   determining a cargo bed intrusion state based on the change of the capacitive field associated with the cargo bed, wherein the cargo bed intrusion state indicates that a person or an object has crossed through a cargo wall threshold associated with the cargo bed and into the cargo bed; and
   generating the cargo alert based on the cargo bed intrusion state.

4. The method according to claim 3, further comprising:
   determining a geographic location associated with the cargo bed intrusion state;
   updating an intrusion event log to record the geographic location; and
   sending the cargo alert to a mobile device associated with the vehicle.

5. The method according to claim 3, further comprising:
   triggering, responsive to the cargo bed intrusion state, an image sensor to obtain an image of the cargo bed.

6. The method according to claim 5, further comprising:
   determining a value for ambient light;
   activating a cargo bed lamp responsive to determining that the ambient light is below a threshold value; and
   triggering the image sensor to obtain the image of the cargo bed while activating the cargo bed lamp.

7. The method according to claim 3, further comprising:
   responsive to determining that the person or the object has crossed the cargo wall threshold, determining that a vehicle key is not within a threshold distance from the vehicle;

sounding an audible alarm; and
sending the cargo alert to a mobile device associated with the vehicle.

8. The method according to claim 7, further comprising sending a photo or video image to the mobile device that shows the person or the object crossing the cargo wall threshold.

9. The method according to claim 3, further comprising receiving, from a mobile device, a response message having a vehicle control instruction; and
saving, to a computer memory, a video feed of the person or the object crossing the cargo wall threshold responsive to the vehicle control instruction.

10. The method according to claim 1, wherein determining the change of the capacitive field comprises:
receiving, from a capacitive sensor bank disposed proximate to the cargo bed of the vehicle, a first capacitance value for the capacitive field;
receiving, from a capacitive sensor bank, a second capacitance value for the capacitance field; and
determining, based on the first capacitance value and the second capacitance value, that the object in the cargo bed has changed position with respect to the cargo bed.

11. The method according to claim 10, wherein the capacitive sensor bank comprises a first sensor disposed at a first position of a cargo bed wall and a second sensor disposed at a second position of a cargo bed wall.

12. The method according to claim 11, wherein determining the change of the capacitive field comprises:
determining that the object in the cargo bed has changed position with respect to the cargo bed; and
determining a relative position of the cargo with respect to the first position of the cargo bed wall and the second position of the cargo bed wall; and
generating the cargo alert based on the position change of the object in the cargo bed, wherein the cargo alert comprises an indication of the relative position of the cargo.

13. A system, comprising:
a processor; and
a memory for storing executable instructions, the processor programmed to execute the instructions to:
determine a vehicle drive state for a vehicle;
select a capacitive field sample rate for a capacitive sensor associated with a cargo bed of the vehicle based on the vehicle drive state;
determine, based on data from the capacitive sensor obtained at the capacitive field sample rate, that a change of a capacitive field associated with a cargo bed of the vehicle is indicative of a position change of an object in the cargo bed; and
generate a cargo alert based on the position change of the object in the cargo bed.

14. The system according to claim 13, wherein the processor is further programmed to execute the instructions to:
select a capacitive sensor input voltage based on the vehicle drive state; and
determine, based on the capacitive sensor input voltage, the position change of the object in the cargo bed.

15. The system according to claim 13, wherein the processor is further programmed to execute the instructions to:
determine a cargo bed intrusion state based on the change of the capacitive field associated with the cargo bed, wherein the cargo bed intrusion state indicates that a person or an object has crossed through a cargo wall threshold associated with the cargo bed and into the cargo bed; and
generating the cargo alert based on the cargo bed intrusion state.

16. The system according to claim 15, wherein the processor is further programmed to execute the instructions to:
determine a geographic location associated with the cargo bed intrusion state;
update an intrusion event log to record the geographic location; and
send the cargo alert to a mobile device associated with the vehicle.

17. The system according to claim 16, wherein the processor is further programmed to execute the instructions to:
trigger, responsive to the cargo bed intrusion state, an image sensor to obtain an image of the cargo bed.

18. The system according to claim 17, wherein the processor is further programmed to execute the instructions to:
determine a value for ambient light;
activate a cargo bed lamp responsive to determining that the ambient light is below a threshold value; and
trigger the image sensor to obtain the image of the cargo bed while activating the cargo bed lamp.

19. The system according to claim 13, wherein the processor is further programmed to execute the instructions to:
responsive to determining that a person or the object has crossed a cargo wall threshold, determine that a vehicle key is not within a threshold distance from the vehicle;
sound an audible alarm; and
send the cargo alert to a mobile device associated with the vehicle.

20. A non-transitory computer-readable storage medium in a vehicle computer, the computer-readable storage medium having instructions stored thereupon which, when executed by a processor, cause the processor to:
determine a vehicle drive state for a vehicle;
select a capacitive field sample rate for a capacitive sensor associated with the cargo bed of the vehicle based on the vehicle drive state;
determine, based on data from the capacitive sensor obtained at the capacitive field sample rate, that a change of a capacitive field associated with the cargo bed of the vehicle is indicative a position change of an object in the cargo bed; and
generate a cargo alert based on the position change of the object in the cargo bed.

* * * * *